US008024183B2

(12) United States Patent
Navratil et al.

(10) Patent No.: US 8,024,183 B2
(45) Date of Patent: Sep. 20, 2011

(54) SYSTEM AND METHOD FOR ADDRESSING CHANNEL MISMATCH THROUGH CLASS SPECIFIC TRANSFORMS

(75) Inventors: Jiri Navratil, White Plains, NY (US); Jagon Pelecanos, Ossining, NY (US); Ganesh N. Ramaswamy, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 12/132,079

(22) Filed: Jun. 3, 2008

(65) Prior Publication Data

US 2008/0235007 A1  Sep. 25, 2008

Related U.S. Application Data

(63) Continuation of application No. 11/391,891, filed on Mar. 29, 2006.

(51) Int. Cl.
*G10L 19/14* (2006.01)
(52) U.S. Cl. ........ 704/225
(58) Field of Classification Search ........ 704/225
See application file for complete search history.

(56) References Cited

U.S. PATENT DOCUMENTS

| | | | |
|---|---|---|---|
| 5,528,731 A | 6/1996 | Sachs et al. | |
| 5,950,157 A | 9/1999 | Heck et al. | |
| 6,032,115 A * | 2/2000 | Kanazawa et al. | 704/234 |
| 6,233,556 B1 * | 5/2001 | Teunen et al. | 704/250 |
| 6,751,588 B1 * | 6/2004 | Menendez-Pidal et al. | 704/233 |
| 6,760,601 B1 * | 7/2004 | Suoknuuti et al. | 455/557 |
| 6,778,957 B2 * | 8/2004 | Wang et al. | 704/233 |
| 6,804,647 B1 * | 10/2004 | Heck et al. | 704/246 |
| 6,873,951 B1 * | 3/2005 | Lin et al. | 704/251 |
| 6,912,497 B2 * | 6/2005 | Gong | 704/228 |
| 6,934,364 B1 * | 8/2005 | Ho | 379/21 |
| 6,980,952 B1 * | 12/2005 | Gong | 704/234 |
| 7,043,427 B1 * | 5/2006 | Kern et al. | 704/233 |
| 7,181,393 B2 * | 2/2007 | Lu et al. | 704/243 |
| 7,240,007 B2 * | 7/2007 | Junqua et al. | 704/273 |
| 7,451,085 B2 * | 11/2008 | Rose et al. | 704/244 |
| 2003/0036903 A1 * | 2/2003 | Konopka et al. | 704/249 |

FOREIGN PATENT DOCUMENTS

WO  WO 98/38632  9/1998

OTHER PUBLICATIONS

R. Teunen, et al., "A Model-13escd Transformational Approach to Robust Speaker Recognition", International Conference on Spoken Language Processing, paper 1642; 4 pages; 2000.
D. A. Reynolds, "Channel Robust Speaker Verification via Feature Mapping", International Conference on Acoustics, Speech and Signal Processing, vol. 2, pp. 53-50; 2003.
P. Kenny et al., Factor Analysis Simplified:, International Conference on Acoustics, Speech and Signal Processing, vol. 1, pp. 637-640; 2005.

\* cited by examiner

*Primary Examiner* — Michael N Opsasnick
(74) *Attorney, Agent, or Firm* — Tutunjian & Bitetto, P.C.; Anne V. Dougherty, Esq.

(57) ABSTRACT

A method and system for speaker recognition and identification includes transforming features of a speaker utterance in a first condition state to match a second condition state and provide a transformed utterance. A discriminative criterion is used to generate a transform that maps an utterance to obtain a computed result. The discriminative criterion is maximized over a plurality of speakers to obtain a best transform for recognizing speech and/or identifying a speaker under the second condition state. Speech recognition and speaker identity may be determined by employing the best transform for decoding speech to reduce channel mismatch.

20 Claims, 3 Drawing Sheets

SYSTEM AND METHOD FOR ADDRESSING CHANNEL MISMATCH THROUGH CLASS SPECIFIC TRANSFORMS

RELATED APPLICATION INFORMATION

This application is a Continuation application of co-pending U.S. patent application Ser. No. 11/391,991 filed Mar. 29, 2006, incorporated herein by reference in its entirety.

GOVERNMENT RIGHTS

This invention was made with Government support under Contract No.: NBCH050097 awarded by the U.S. Department of Interior. The Government has certain rights in this invention.

BACKGROUND

1. Technical Field

The present invention relates to audio classification and more particularly to systems and methods for addressing mismatch in utterances due to equipment or transmission media differences.

2. Description of the Related Art

Speaker recognition and verification is an important part of many current systems for security or other applications. However, under mismatched channel conditions, for example, when a person enrolls for a service or attempts to access their account using an electret handset but wishes to be verified when using a cell phone, there is significant mismatch between these audio environments. This results in severe performance degradation.

Some of the solutions to date include Speaker Model Synthesis (SMS), Feature Mapping (FM) and Intersession Variation Modeling (ISV) and channel specific score normalization. A drawback of these methods includes that SMS and FM perform a model/feature transformation based on a criterion that is unrelated to the core likelihood ratio criterion that is being used to score the result. ISV does not assume discrete channel classes, and score normalization does not directly account for channel mismatch.

Previous work in addressing the channel mismatch problem is similar in that either the features or model parameters are transformed according to some criterion. For example, the SMS technique was a model transformation technique. The SMS technique performed speaker model transformations according to the parameter differences between MAP adapted speaker background models of different handset types.

Some work in the area of speech recognition, although not directly addressing the channel mismatch problem, is also worthy of mention. It examined constrained discriminative model training and transformations to robustly estimate model parameters. Using such constraints, speaker models could be adapted to new environments. Another approach, termed factor analysis, models the speaker and channel variability in a model parameter subspace. Follow up work showed that modeling intersession variation alone provided significant gains in speaker verification performance.

There are several schemes that address channel mismatch from the perspective of feature transformation schemes. One study utilized a neural network to perform feature mapping on an incoming acoustic feature stream to minimize the effect of channel influences. There were no explicit channel specific mappings applied on this occasion. Another technique involved performed feature mapping based on detecting the channel type and mapping the features to a neutral channel domain. This technique mapped features in a similar manner that SMS transforms model parameters. For speech recognition, a piecewise Feature space Maximum Likelihood Linear Regression (fMLLR) transformation is applied to adapt to channel conditions. No explicit channel information is exploited.

SUMMARY

Embodiments of the present systems and methods address the problem of speaker verification under mismatched channel conditions, and further address the shortfalls of the prior art by directly optimizing a target function for the various discrete handsets and channels.

A method and system for speaker recognition and identification includes transforming features of a speaker utterance in a first condition state to match a second condition state and provide a transformed utterance. A discriminative criterion is used to determine the transformation that is applied to the utterance to obtain a computed result. The discriminative criterion is maximized over a plurality of speakers to obtain a best transform function for one of recognizing speech and identifying a speaker under the second condition state. Speech recognition and speaker identity may be determined by employing the best transform for decoding speech to reduce channel mismatch.

A system/method for audio classification includes transforming features of a speaker utterance in a first condition state to match a second condition state and as a result provide a channel matched transformed utterance. A discriminative criterion is maximized over a plurality of speakers to obtain a best transform for audio class modeling under the second condition state.

Another system/method for audio classification includes providing a plurality of transforms for decoding utterances, wherein the transforms correspond to a plurality of input types and applying one of the transforms to a speaker based upon the input type. The transforms are precomputed by transforming features of a speaker utterance in a first condition state to match a second condition state and as a result provide a channel matched transformed utterance, and maximizing a discriminative criterion over a plurality of speakers to obtain a best transform for audio class modeling under the second condition state.

In other systems and methods, the audio class modeling may include speaker recognition and/or speaker identification. A condition state may include a neutralized channel condition which counters effects of a first condition state. The system may undergo many input conditions and apply a best transform for each input condition. Maximizing a discriminative criterion may include determining a likelihood of a speaker based on discrimination between speaker classes to identify the speaker. Speech decoding may be based on a selected transform.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present disclosure provide a discriminative criterion applied to Gaussian Mixture Models (GMMs) to reduce input device and transmission media mismatches. The criterion is naturally optimized and is preferably suited to a Log-Likelihood-Ratio (LLR) scoring approach commonly used for speaker recognition. The LLR algorithm combined with the transformation approach attempts to perform a direct mapping of features from one channel type to an assumed undistorted target channel but with the goal of maximizing speaker discrimination using a transform. The transform attempts to directly maximize posterior probabilities and is targeted to reduce mismatch between handsets, microphones, input equipment and/or transmission media accordingly.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Preferred embodiments provide a discriminative criterion applied to Gaussian Mixture Models (GMMs) to reduce input device mismatch. The criterion is naturally optimized and is suited to the Log-Likelihood-Ratio (LLR) scoring approach commonly used in GMMs for speaker recognition. The algorithm attempts to perform a direct mapping of features from one channel type to an assumed undistorted target channel but with the goal of maximizing speaker discrimination using the transform (preferably class specific transforms). The transform attempts to maximize the posterior probability of the speech observations across a set of speaker models.

One of the largest challenges in telephony based speaker recognition is effectively mitigating the degradation attributed to handset and channel mismatch. There are a number of techniques described above which address this issue. These approaches reduce mismatch through the modification of the features or adjustment of the models themselves to suit the new condition.

The present approach addresses the channel mismatch issue through the direct transformation of features using a discriminative criterion. The present disclosure performs a transformation dependent upon the channel type of a test recording and a desired target channel type that the features are to be mapped to. It may also be optimized in a manner that does not require explicit knowledge of the channel itself.

In contrast to previous work, a mapping optimization function is trained by maximizing a simplified version of a joint likelihood ratio scoring metric using held out data from many speakers. The goal of the mapping function is to obtain a transformation that maximizes the joint log-likelihood-ratio of observing the utterances from many speakers against their corresponding target speaker and background speaker models.

A discriminative design framework is formulated by optimizing joint model probabilities. The discriminative design framework includes a system useful in non-speech differences and distortion that may be present on a microphone or other input device between training and/or different use sessions. An illustrative example will be employed to demonstrate principles of the present embodiments.

A speaker recognition system is given a transformed utterance $\vec{Y}$ for a speaker, and performs the following evaluation to determine if the test utterance belongs to the target speaker model, $\lambda^s$. If the speaker score $\lambda^s$ is above a specified threshold, the speaker claim is accepted, otherwise the claim is rejected. It is also the same criterion used for optimizing for the mismatch between audio sessions, giving a natural optimization result.

$$\Lambda^s = Pr(\lambda^s | \vec{Y}) \quad (1)$$

$$= \frac{P(\lambda^s)p(\vec{Y} | \lambda^s)}{\sum_{\forall h} P(\lambda^h)p(\vec{Y} | \lambda^h)} \quad (2)$$

Here, $P(\lambda^s)$ and $P(\lambda^h)$ are the prior probabilities of an utterance being from speaker s and h correspondingly, where s and h are speaker indexes. The posterior probability of speaker model $\lambda^s$, given the speaker's utterance $\vec{Y}$, is indicated by $Pr(\lambda^s|\vec{Y})$. The likelihood of the observations, $\vec{Y}$ given the model $\lambda^h$ is given by $p(\vec{Y}|\lambda^h)$.

Given that the model was trained using audio data from one channel (say, e.g., an electret type landline handset) while the test utterance was recorded under different channel conditions (say, e.g., a carbon button type landline handset), it may prove useful to transform the features of the test utterance to match the channel conditions of the model training component.

In one embodiment, a feature transformation function is employed to maximize equation (1) but across many speakers (S). Hence, a joint probability of the speakers (s=1 to S) given their corresponding observations is maximized. The calculation of a Jacobian matrix is not required as the optimization function is a ratio of densities.

$$Q_1 = \prod_{s=1}^{S} Pr(\lambda^s | \vec{Y}^s) \quad (3)$$

$$= \prod_{s=1}^{S} \frac{P(\lambda^s) p(\vec{Y} | \lambda^s)}{\sum_{\forall h} P(\lambda^h) p(\vec{Y} | \lambda^h)} \quad (4)$$

Here the denominator of equation (4) may be represented by a single Universal Background Model (UBM) or a model representative of all speaker classes. Note that in a similar manner the most competitive impostor model for each speaker utterance could be substituted in place for the UBM in the denominator of (4). One important point to consider is that depending on the functional form of the numerator and denominator pair of equation (4), the final optimization function may become too complex or may not deliver an optimization problem with a stationary point.

If it is assumed that the denominator of (4) will be represented as a collection of speaker models (e.g., class specific models) then the optimization function will become more complex. An alternative to using many speaker models in the denominator of (4) is to consider that these speaker models have parameters that follow a particular distribution, $p(\lambda)$. In this case, a Bayesian predictive estimate (known in the art) may be given for the denominator of (4). With speaker class prior probabilities being equal, this gives the following result.

$$Q_2 = \prod_{s=1}^{S} \frac{p(\vec{Y}^s | \lambda^s)}{\int p(\lambda) p(\vec{Y}^s | \lambda) d\lambda} \quad (5)$$

Let $p(\vec{Y} | \lambda^s)$ be represented by a Gaussian Mixture Model (GMM), comprised of N Gaussian components, with the set of weights, means and diagonal covariances given as $$\{\omega_i^s, \mu_i^s, \Sigma_i^s\}_{\forall i}.$$

If $\vec{Y}$ includes $T^s$ independent and identically distributed observations represented by $\{y_1^s, y_2^s, \ldots, y_T^s\}$ then the joint likelihood of the D-dimensional observations may be calculated.

$$p\left(\vec{Y}^s | \lambda^s\right) = \prod_{t=1}^{T^s} \prod_{i=1}^{N} \omega_i^s g(y_i^s | \mu_i^s, \Sigma_i^s) \quad (6)$$

where (7)

$$g(y_i^s | \mu_i^s, \Sigma_i^s) = \frac{1}{\sqrt{(2\pi)^D |\Sigma_i^s|}} \times \exp\{(y_i^s - \mu_i^s)' (\Sigma_i^s)^{-1} (y_i^s - \mu_i^s)\}$$

The notation (') represents the transpose operator. Now the problem of specifying the distribution of the speaker model parameters is addressed. Let all speaker models be the MAP adaptation representation (known in the art) of a Universal Background Model which is trained on a large quantity of speech. For one embodiment only the mixture component means (μ) are adapted (indicating a minimal degradation attributed to such constraints).

The speaker model component mean parameters are assumed to be independent and are governed by a Gaussian distribution with $\{m_i, C_i\}$. Thus, in a similar vain, the representation for $p(\lambda^s)$ is established. For example:

$$p(\lambda^s) = \prod_{i=1}^{N} g(\mu_i^s | m_i, C_i) \quad (8)$$

The denominator may now be evaluated. Let the joint likelihood of the observations be approximated by considering only the most significant Gaussian component contribution for each frame. This approximation is most appropriate for sparse mixture components.

$$p(\vec{Y} | \lambda^s) \approx \prod_{t=1}^{T^s} \max_{i=1}^{N} \{\omega_i^s g(y_i^s | \mu_i^s, \Sigma_i^s)\} \quad (9)$$

Given this assumption, the predictive likelihood may be calculated. The result is given by equation 10. A Viterbi approach for estimating the Bayesian predictive density may be referenced.

$$\int_{\lambda} p(\lambda) p(\vec{Y}^s | \lambda) d\lambda \approx \prod_{t=1}^{N} \left(\frac{\omega_i}{(2\pi)^{D/2}}\right)^{n_i^s} \prod_{d=1}^{D} \sqrt{\frac{\Phi_{i_{dd}}^s}{(\Sigma_{i_{dd}})^{n_i^s}}} \times \quad (10)$$

$$\exp\left\{\begin{array}{l} -\frac{n_i^s}{2\Sigma_{i_{dd}}} \Phi_{i_{dd}}^s \overline{(y_{i_d}^s - m_{i_d})^2} + \\ (1 - \Phi_{i_{dd}}^s)(\overline{y_{i_d}^s}^2 - \overline{y_{i_d}^s}^2) \end{array}\right\}$$

where $n_i^s = \sum_{\forall t \in y_t^s \in i} 1$ (11)

$$\overline{y_{i_d}^s} = \frac{1}{n_i^s} \sum_{\forall t \in y_t^s \in i} y_{i_d}^s \quad (12)$$

$$\overline{y_{i_d}^s}^2 = \frac{1}{n_i^s} \sum_{\forall t \in y_t^s \in i} y_{i_d}^{s^2} \quad (13)$$

$$\Phi_{i_{dd}}^s = \frac{1}{n_i^s C_{i_{dd}} \Sigma_{i_h}^{-1} + 1} \quad (14)$$

and $\overline{(y_{i_d}^s - m_{i_d})^2} = \overline{y_{i_d}^s}^2 - 2m_{i_d} \overline{y_{i_d}^s} + m_{i_d} m_{i_d}$ (15)

Here, $\{y_{i_d}^s, m_{i_d}\}$ represents the $d^{th}$ element within their respective vectors $\{y_t^s, m_i\}$. Correspondingly, $\{\Sigma_{i_{dd}}, C_{i_{dd}},$ $\Phi_{i_{dd}}{}^s\}$ represent the element in the $d^{th}$ row and $d^{th}$ column of the appropriate diagonal covariance matrices $\{\Sigma_i, C_i, \Phi_i^s\}$.

Now in the case where there is a single speaker being scored, as in the numerator condition, the model distribution becomes a point observation. This is achieved by setting $C_{i_{dd}}$ to 0 and gives the following result which is equivalent (depending on the optimal mixture component selection criterion) to the standard GMM likelihood scoring when only the top Gaussian is scored.

$$p(\vec{Y}|\lambda^s) \approx \prod_{i=1}^{N} \left(\frac{\omega_i}{(2\pi)^{D/2}}\right)^{n_i^s} \prod_{d=1}^{D} \frac{1}{\sqrt{(\Sigma_{i_{dd}})^{n_i^s}}} \times \exp\left\{-\frac{n_i^s}{2\Sigma_{i_{dd}}}\left((y_{i_d}^s - \mu_{i_d})^2\right)\right\} \quad (16)$$

Given this derivation, let us calculate the log of the ratio of the target speaker joint likelihood and the likelihood of all other speakers for a set of S utterances and corresponding models. For example:

$$\log Q_2 = \sum_{s=1}^{S} \left(\log p(\vec{Y}^s|\lambda^s) - \log \int_{\lambda} p(\lambda)p(\vec{Y}^s|\lambda)d\lambda\right) \quad (17)$$

The maximization problem may be simplified further if it is considered that the derivative of this function with respect to transformation variables is calculated. It is assumed that the Gaussian mixture models are calculated through Bayesian adaptation of the mixture component means from a Universal Background GMM. All model parameters are coupled to the Universal Background Model; which includes the S target speaker models and the denominator model representation. The most significant mixture components are determined by using Equation (9) and extracting the Gaussian indexes by scoring on the Universal Background GMM. These indexes are used to score the corresponding Gaussian components in all other models. With these constraints, the function to maximize is the following:

$$Q = \sum_{s=1}^{S} \sum_{i=1}^{N} \sum_{d=1}^{D} \left\{\frac{n_i^s}{2\Sigma_{i_{dd}}} \times \left(2(\mu_{i_d}^s - \Phi_{i_{dd}}^s m_{i_d})\overline{y_{i_d}^s} - (1-\Phi_{i_{dd}}^s)\overline{y_{i_d}^s}^2\right)\right\} \quad (18)$$

For simplicity, the algorithm was represented such that for a single speaker model created from a single enrollment utterance, there was a single test utterance to score the utterance. Further richness can be achieved in the optimization process if multiple models and/or test utterances are trained for each speaker. Depending on the viewpoint, one benefit of the optimization function is that the unique one-to-one mapping needed when a Jacobian matrix is factored in is not required here. This also permits for the situation where two modes present under one channel condition may manifest themselves as a single mode under another channel. Given this flexibility, an appropriate transform for $\vec{Y}^s$ is selected.

Transform Selection

A final transform may be represented as a combination of affine transforms according to posterior probability. For example:

$$y = \Psi(x) = \sum_{j=1}^{J} \Pr(j|x)\Psi_j(x) \quad (19)$$

with $$\Pr(j|x) = \frac{\breve{\omega}_j g\left(x|\breve{\mu}_f, \breve{\Sigma}_j\right)}{\sum_{z=1}^{J} \breve{\omega}_z g\left(x|\breve{\mu}_z, \breve{\Sigma}_z\right)} \quad (20)$$

where $\{\breve{\omega}_j, \breve{\mu}_j, \breve{\Sigma}_j\}$ is the set of mixture component weights, means and covariances, respectively for a J component Gaussian Mixture Model. The purpose of this GMM is to provide a smooth weighting function of Gaussian kernels to weight the corresponding combination of affine transforms.

Note also that throughout the optimization problem the posterior probabilities need only to be calculated once. This GMM, used to determine the mixture component probabilities, could be the same as the Universal Background Speaker model for adapting speakers or a separate model altogether.

Here $\Psi(\cdot)$ is selected to be of a form with a controllable complexity similar to SPAM models, which are known in the art.

$$\Psi_j(x) = A_j x + b_j \quad (21)$$

with the set of $A_j$ and $b_j$ being controllable in complexity as follows:

$$A_j = \theta_j^A R_j + \sum_{k=1}^{K} \theta_j^k V_k \quad (22)$$

and $$b_j = \theta_j^b r_j + \sum_{k=1}^{K} \theta_j^k v_k \quad (23)$$

where $R_j$ is a mixture component specific transform matrix, and $\theta_j^k$ is the weighting factor applied to the $k^{th}$ transform matrix $V_k$. In summary, the resulting transform matrix, $A_j$, for mixture component j is a linear combination of a small set of transforms. The matrix $R_j$ is typically a zero matrix, or a constrained matrix to enable some simplified transforms that would not typically be available using the remaining transformation matrices. It may also be a preset mixture-component-specific matrix that is known to be a reasonable solution to the problem.

Conversely, the offset vector for mixture component j may be determined in a similar manner with $r_j$ being the mixture component specific offset, and $v_k$ being the $k^{th}$ offset vector. The vector $r_j$ is typically a zero vector or a pre-selected, mixture component specific, vector constant. In the case when the vector is a preset constant, the remainder of the equation is designed to maximize the target function by optimizing for the residual.

An alternative weighting function is also proposed as an alternative that considers only the top scoring mixture component.

$$\Psi_j(x) = \Psi_{jmax}(x) \quad (24)$$

where

-continued
$$jmax = \underset{j=1}{\overset{J}{\operatorname{argmax}}} \Pr(j \mid x)$$

Optimization

Equation (18) may be maximized with the transformation function used from Equation 19 using a number of techniques. Between iterations, if no transformed observations change which significant Gaussian class they belong to in the original acoustic UBM, the problem is a matrix-quadratic optimization problem. In one embodiment, due to transformed vectors changing their Gaussian class between iterations, a gradient ascent approach is taken. Consequently, the functional derivative needs to be determined.

For the derivative calculation, it is assumed that no or very few mapped feature vector observations lie on or near the decision boundary between two Gaussians (in which case the slope estimate is only an approximation). Depending on the configuration of the system this assumption may be significant and would then need an additional derivative approximation for the mixture component counts. If A and b are to be optimized directly, the partial derivative approximation with respect to one of the optimization variables, $\Omega$, is presented.

$$\frac{\partial Q}{\partial \Omega} = \sum_{s=1}^{S} \sum_{i=1}^{N} \sum_{d=1}^{D} \left\{ \frac{n_i^s}{\sum_{i_{dd}}} \left( \frac{\partial \overline{y_{i_d}^s}}{\partial \Omega} \right) \times \left( (\mu_{i_d}^s - \Phi_{i_{dd}}^s m_{i_d}) - (1 - \Phi_{i_{dd}}^s) \overline{y_{i_d}^s} \right) \right\} \quad (25)$$

The variable $$\frac{\partial \overline{y_{i_d}^s}}{\partial \Omega}$$

may be substituted by any one of the following partial derivative results in the equations following.

$$\gamma_{j_1}^s = \Pr(j \mid x_i^s) \quad (26)$$

$$\frac{\partial \overline{y_{i_d}^s}}{\partial b_{j_d}} = \frac{1}{n_i^s} \sum_{\forall t \ni y_t' \in i} \gamma_{j_1}^s \quad (27)$$

$$\frac{\partial \overline{y_{i_d}^s}}{\partial A_{j_{du}}} = \frac{1}{n_i^s} \sum_{\forall t \ni y_t' \in i} \gamma_{j_1}^s x_{t_u}^s \quad (28)$$

$$\frac{\partial \overline{y_{i_d}^s}}{\partial A_{f_u}} = 0 \text{ if } d \neq f \quad (29)$$

This results in a series of equations to solve. Note that the assumption here is that the transformation variations between iterations are small and that the number of observations changing from iteration to iteration is negligible.

Correspondingly, if a SPAM model equivalent is substituted to reduce the number of parameters to optimize, the slope functions become the following.

The mixture component specific transformation weightings are as follows. These weighting factors are established for the reason efficiently managing the search space for the transformation.

$$\frac{\partial \overline{y_{i_d}^s}}{\partial \theta_j^A} = \frac{1}{n_i^s} \sum_{\forall t \ni y_t' \in i} \gamma_{j_1}^s \sum_{q=1}^{D} R_{j_{d_1}} x_{t_q}^s \quad (30)$$

$$\frac{\partial \overline{y_{i_d}^s}}{\partial \theta_j^b} = \frac{1}{n_i^s} \sum_{\forall t \ni y_t' \in i} \gamma_{j_1}^s r_{j_d} \quad (31)$$

$$\frac{\partial \overline{y_{i_d}^s}}{\partial \theta_j^k} = \frac{1}{n_i^s} \sum_{\forall t \ni y_t' \in i} \gamma_{j_1}^s \left( v_{k_d} + \sum_{q=1}^{D} V_{k_{d_1}} x_{t_q}^s \right) \quad (32)$$

The derivative may be calculated for the subspace matrices and vectors.

$$\frac{\partial \overline{y_{i_d}^s}}{\partial v_{k_d}} = \frac{1}{n_i^s} \sum_{\forall t \ni y_t' \in i} \sum_{j=1}^{J} \gamma_{j_1}^s \theta_j^k \quad (33)$$

$$\frac{\partial \overline{y_{i_d}^s}}{\partial V_{k_{du}}} = \frac{1}{n_i^s} \sum_{\forall t \ni y_t' \in i} \left( \sum_{j=1}^{J} \gamma_{j_1}^s \theta_j^k \right) x_{t_u}^s \quad (34)$$

$$\frac{\partial \overline{y_{i_d}^s}}{\partial V_{k_{fu}}} = 0 \text{ if } d \neq f \quad (35)$$

Let $\Omega$ be the vector of variables that is to be optimized in terms of maximizing Q. The gradient ascent algorithm can now used accordingly, given the parametric estimates of the slopes.

$$\Omega_{new} = \Omega_{old} + \eta \left( \frac{\partial \log Q}{\partial \Omega} \bigg|_{\Omega_{old}} \right) \quad (36)$$

where $\eta$ is the learning rate.

Generalized Mapping: In the embodiments described above, the methods were employed to determine an optimal mapping between a first channel state and a second channel state. In another form, the mapping that is calculated may include learning, and optimizing for, a series of possible transformations (rather than just one) such that explicit knowledge of the channel is not required. In addition, the mapping system can then map arbitrarily from any channel state to any other channel state. In this sense, the optimization functions of equations (3), (4) or (5) may include a feature mapping function that is internally comprised of multiple transforms (as opposed to a single transform). The applied mapping is formed from several transforms that are selected (or weighted) according to their relevance. Once the mapping block has learned the set of transforms, the speaker recognition system may be evaluated. The multi-transform mapping block is then used to map all utterances. The benefit is that no explicit handset or channel labels are required.

Alternative Optimization Function

There are many different transformation optimization functions that can be determined and derived using a similar process. For the purpose of illustration, another example derivation follows. An estimate of equation (3) was presented in equation (5) and its optimization procedure was derived. In a similar manner, equation (4), although more computationally expensive, may also be optimized using a set of speaker or audio class models. In the log domain, equation (4) may be represented as an alternative (logQ$_{\lambda,2}$) to equation (17) as follows:

$$\log Q_{A2} = \sum_{s=1}^{S} \left( \log p(\overline{Y}^s | \lambda^s) - \log \sum_{\forall h} p(\overline{Y}^s | \lambda^h) \right) \quad (37)$$

Under similar constraints to the previously suggested optimization function, the core function to optimize is given as:

$$Q_A = \sum_{s=1}^{S} \left\{ \left( \sum_{i=1}^{N} \sum_{d=1}^{D} \frac{n_i^s}{2 \sum_{i_{dd}}} [2\overline{y_{i_d}^s} \mu_{i_d}^s - (\mu_{i_d}^s)^2] \right) - \log \left( \sum_{\forall h} \exp \left\{ \sum_{i=1}^{N} \sum_{d=1}^{D} \frac{n_i^s}{2 \sum_{i_{dd}}} [2\overline{y_{i_d}^s} \mu_{i_d}^h - (\mu_{i_d}^h)^2] \right\} \right) \right\} \quad (38)$$

To optimize this function, the same steepest ascent procedure is preferably selected. To perform the optimization an approximation to the slope is needed. In this slope approximation, it is assumed that $n_i^s$ remains relatively constant. In many instances this assumption may not be appropriate. Accordingly, an approximation to the derivative is presented.

$$\frac{\partial Q}{\partial \Omega} \approx \sum_{s=1}^{S} \sum_{i=1}^{N} \sum_{d=1}^{D} \left\{ \frac{n_i^s}{\sum_{i_{dd}}} \left( \frac{\partial \overline{y_{i_d}^s}}{\partial \Omega} \right) \times \left( \mu_{i_d}^s - \sum_{\forall h} \Pr(\lambda^h | \overline{Y}^s) \mu_{i_d}^h \right) \right\} \quad (39)$$

Here $\Pr(\lambda^h | \overline{Y}^s)$ is the probability of the speaker model $\lambda^h$ given the transformed utterance, $\overline{Y}^s$. The term, $$\frac{\partial \overline{y_{i_d}^s}}{\partial \Omega},$$

may be substituted by any of the corresponding equations from equation (27) to equation (35). The steepest ascent algorithm may be performed, as before, to determine the transform or transforms to apply.

Efficient Algorithmic Implementation

Due to the nature of the optimization process, a number of techniques can be introduced to speed up the procedure. As already identified and derived above, the single top mixture component for each audio frame is scored. This may also be extended to the feature transformation mapping algorithm such that only the mapping corresponding to the top scoring feature partitioning GMM is applied rather than summing over the contributions of the mappings corresponding to all mixture components. In addition to using only the top mixture component throughout the system, the target and background model representations can be forced to be a function of the Universal Background Model (UBM); a coupled model system. Consequently, the UBM can be used to determine which mixture components are the largest contributors to the frame based likelihood. Thus, once the Gaussian indexes are obtained from the UBM, they may be applied to the coupled target adapted model and the background model representations. It is noted that the top 5 mixture components were considered for the transformation function GMM. This approximation introduced significant speedups. Each of these previously mentioned items were included in the current system but it should be noted that additional speed optimizations are available.

One technique is to test if a particular Gaussian is the most significant Gaussian for the current feature vector. Given that this algorithm is iterative and applies small adjustments to the mapping parameters, a Gaussian component that was dominant on a previous iteration may also be relevant for the current iteration. If the probability density of the vector for the Gaussian is larger than the predetermined threshold for the appropriate Gaussian component, then it is the most significant Gaussian for the GMM. This technique operates more effectively for sparse Gaussian mixture components.

Another method is to construct, for each Gaussian component, a table of close Gaussians or Gaussian competitors. Given that the mapping parameters are adjusted in an incremental manner, the Gaussian lookup table for the most significant Gaussian of the previous iteration may be evaluated to rapidly locate the most significant Gaussian for the next iteration. The table length may be configured to trade off the search speed against the accuracy of locating the most likely Gaussian component.

Figure 1:
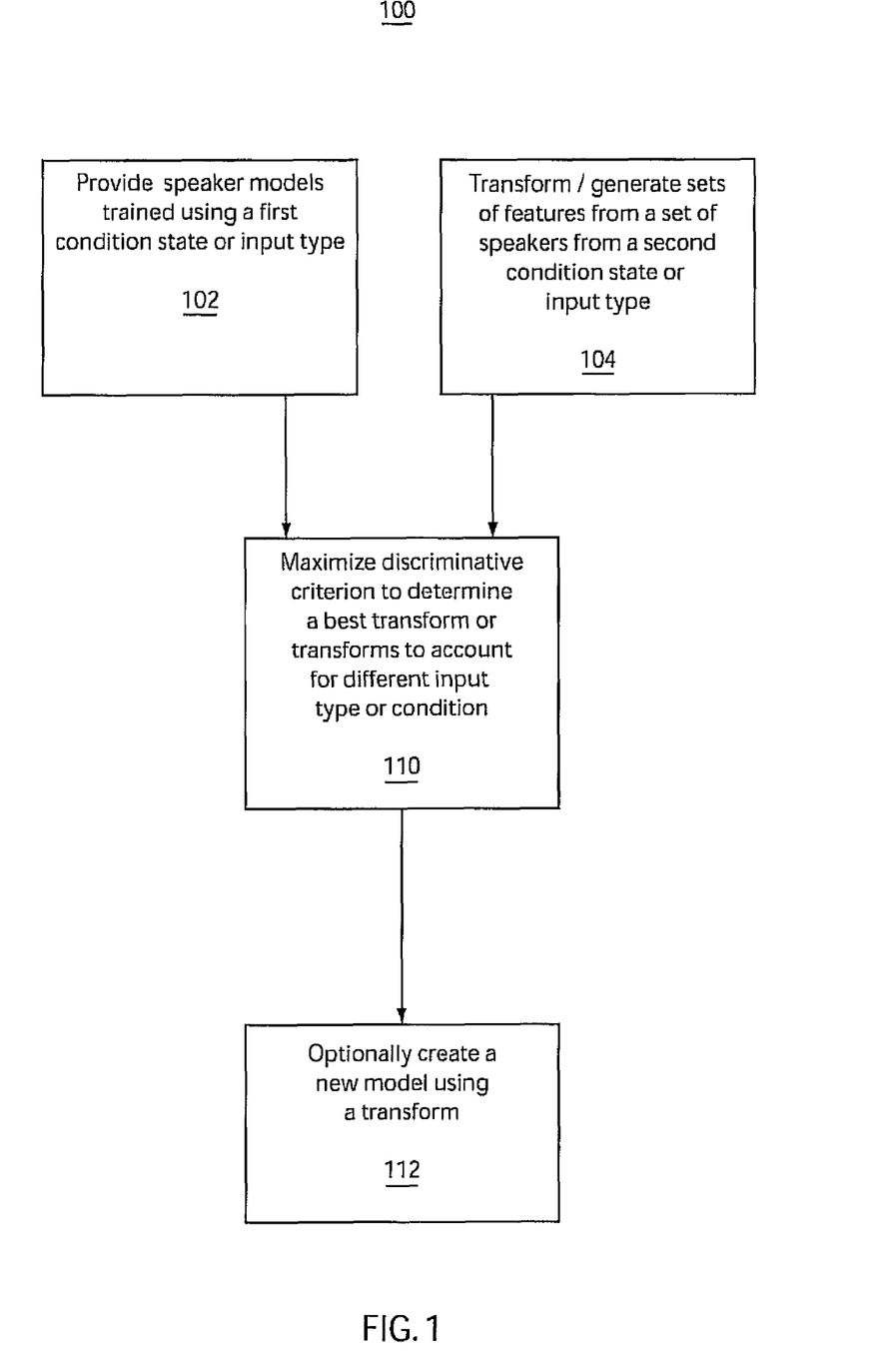
FIG. 1 is a block/flow diagram showing a system/method for adjusting models and determining transforms to reduce channel mismatch in accordance with one illustrative embodiment.

Referring now to the drawings in which like numerals represent the same or similar elements and initially to FIG. 1, a system/method 100 is illustratively shown which provides a speaker recognition and identification system in accordance with one embodiment. In block 102, speaker models trained using a first condition state or input type are provided. For example, speaker models trained using a landline telephone or a microphone to collect speaker utterances are stored in a database or provided as a model. These models may be created from audio from a single channel type. In block 104, feature sets from a set of speaker utterances in a second condition state are generated as input for a discriminative training criterion.

In block 110, the discriminative criterion (from blocks 102 and 104) is maximized over a plurality of speakers by applying, e.g., a steepest ascent algorithm (or similar optimization) to determine a best transform function or set of transform functions. This includes maximizing $Q_I$ in equation (3) (or $Q_A$ in equation (39).

In block 110, a discriminative criterion objective function is specified using the existing speaker models and the non-transformed utterances. This discriminative criterion is applied to generate the transformed utterance to obtain a computed result, which may be determined either arbitrarily or empirically. An optimization metric of a speaker based on discrimination between speaker classes is preferably performed. The discriminative criterion may include equation (3) (or equation (39)).

The result giving the objective function maximum gives the transform or transforms. This transform may then be used to convert/map or neutralize the inputs received over a different input type. The transforms may be adjusted to provide accommodation for the currently used input type.

The best transform may be used for recognizing speech and/or identifying a speaker under the condition state of the received utterance to reduce channel mismatch. The system may undergo many input conditions and a best transform may be applied for each input condition. In one embodiment posterior probabilities are maximized in the maximizing step.

The present embodiments use speaker classes to determine the transform. The result is that the most likely speaker is determined instead of the most likely acoustic match. In addition, the transform is calculated once to maximize Q such that the maximum Q gives the transform. The speaker space is broken down based on subsets or classes of speakers. The maximum likelihood (or a related metric) of seeing a particular speaker is used to determine the transform (as opposed to simply matching the acoustic input).

In block 112, at least one speaker model may be transformed using the best transform to create a new model for decoding speech or identifying a speaker. The speaker model may be transformed from a first input type to a second input type by directly mapping features from the first input type to a second input type using the transform.

The mapping done by the transform may include learning, and optimizing for, a series of possible transformations (rather than just one) such that explicit knowledge of the channel is not required. In addition, the mapping system can then map arbitrarily from any channel state to any other channel state. Once the mapping block has learned the set of transforms, the speaker recognition system may be evaluated. The multi-transform mapping block is then used to map all utterances. The benefit is that no explicit handset or channel labels are required.

Figure 2:
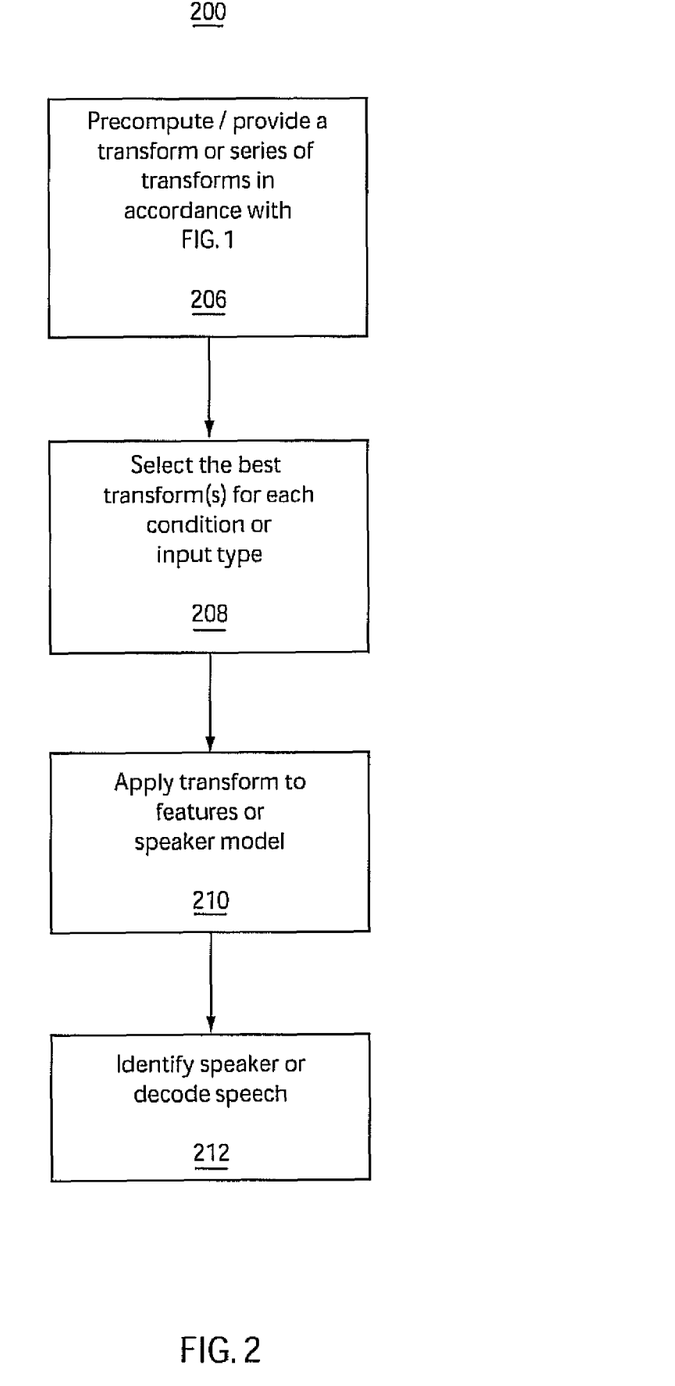
FIG. 2 is a block/flow diagram showing a system/method for identifying a speaker or recognizing speech in accordance with another illustrative embodiment.

Referring to FIG. 2, a system/method 200 for speaker recognition and identification in accordance with an illustrative embodiment is shown. A similar method may be employed for other audio analysis as well. A plurality of transforms is provided for decoding utterances, wherein the transforms correspond to a plurality of input types or conditions. This may include a single transform or a plurality of transforms to handle multiple conditions. In block 210, a transforms is applied to features from a speaker based upon the input type or all input types. Block 206 indicates that the transforms are precomputed by the method shown in FIG. 1. The precomputation of the transform or transforms may be performed at the time of manufacture of the system or may be recomputed intermittently to account for new input types or other system changes.

In block 208, the best transform or series of transforms are determined for each or all input types and applied by determining conditions under which a speaker is providing input. The input types may include, e.g., telephone handset types, channel types and/or microphone types. The best transform may include transforming the input to a neutralized channel condition which counters effects of the input state or any other transform that reduces mismatch between input types.

In block 212, the speaker is identified or the utterance is decoded in accordance with the input type correction provided herein. Advantageously, channel mismatch is reduced or eliminated.

In the same way that the discriminative technique was designed to perform a channel mapping that was optimized to differentiate between speakers, the same procedure as described above may be applied to other audio applications related to audio scene analysis, music and song detection and audio enhancement of corrupted audio channels. One such example would be to recognize artists or songs being played over the radio or media. This greatly reduces the effect of the channel differences on the system attempting to detect the song type or artist. The technique effectively removes the differences between different audio channels and simplifies the matching process for the audio classifier. Other applications are also contemplated.

Experiments:

Evaluation and development data: To demonstrate the present invention, a speaker recognition system was evaluated on the NIST 2000 dataset. This particular dataset is comprised mostly of landline telephone calls from carbon-button or electret based telephone handsets. Given that there are two classes of audio data, the feature transformation mechanism was designed to map from carbon-button features to electret based features. In this database, for the primary condition, there are 4991 audio segments (including 2470 male test and 2521 female test audio segments) tested against over 1003 speakers, of which 457 speakers are male and 546 speakers are female.

The audio training utterance durations were approximately two minutes with test utterance durations of 15-45 seconds. The NIST 1999 speaker recognition database was included as development data to train the UBM and the corresponding carbon handset to electret handset transformation function. This database was selected because of the significant quantity of carbon and electret handset data available. The same principle may be applied to the more recent speaker recognition evaluations by providing several channel mapping functions dependent upon the channel type.

System Description used in Experiments

A speaker recognition system in accordance with embodiments of the present invention includes two main components, a feature extraction module and a speaker modeling module, as is known in the art.

For the feature extraction module in accordance with one embodiment, Mel-Frequency Cepstral Coefficients (MFCCs) are extracted from filter banks. In an illustrative embodiment, 19 Mel-Frequency Cepstral Coefficients (MFCCs) were extracted from 24 filter banks. The cepstral features may be extracted, e.g., by using 32 ms frames at a 10 ms frame shift. The corresponding delta features were calculated.

Feature Warping may be applied to all features to mitigate the effects of linear channels and slowly varying additive noise. The speaker modeling module generated speaker modeling through MAP adaptation of a Universal Background Model. This implementation of the MAP adaptation approach adjusted the Gaussian components toward the target speaker speech features. The mixture component mean parameters were also adapted. In this work, a single iteration of the EM-MAP algorithm was performed. In testing, only the top mixture component from the UBM was scored and used to reference the corresponding components in other models. Other mixtures and numbers of mixture components may also be employed.

Results

A version of the system was evaluation for a challenging subset of the NIST 2000 Evaluation. The subset of trials was selected purposely to identify the effect of the channel mapping from the carbon test utterance type to the electret model type. Thus, only carbon tests against electret models were evaluated in this subset. The results indicated a reduction in minimum detection cost function (DCF) from 0.057 to 0.054 and a decrease in equal error rate (EER) from 14.9% to 13.0%. The improvements were realized using a single transformation determined from 100 unique speakers. Additional error reductions are expected by using more speaker data to calculate the transform, The results described herein are for illustrative purposes only.

Figure 3:
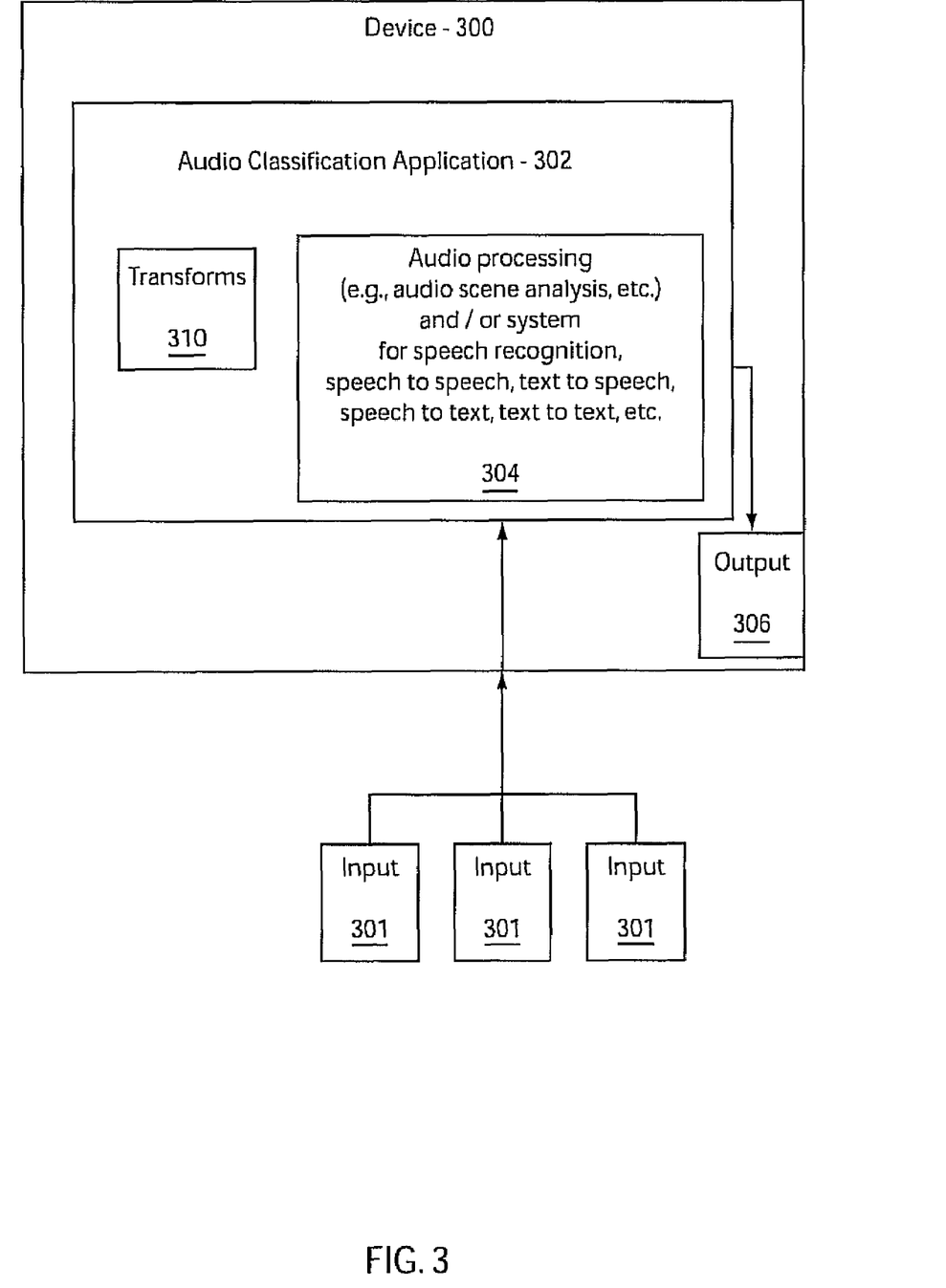
FIG. 3 is a block diagram showing a device which implements features in accordance with the present embodiments.

Referring to FIG. 3, a system 300 for providing class specific transformations based on input type or conditions is illustratively depicted. An audio classification system or device 300 may include a personal computer, a telephone system, an answering system, a security system or any other device or system where multiple users or multiple users and/or multiple input types or devices may be present. Device 300 is capable of supporting a software application or module 302 which provides audio classification, which can map the input types as described above to enable identification of a speaker, the decoding of utterances or other audio classification processes. Application 302 may include a speech recognition system, speech to speech system, text to speech system or other audio classification processing module 304 capable of audio processing (e.g., for audio scene analysis, etc.).

In one embodiment, input utterances may be received from a plurality of different input types and/or channels (telephones, microphones, etc.). Inputs 301 may include microphones of different types, telephones of different types, pre-recorded audio sent via different channels or methods or any other input device. A module 306 may include a speech synthesizer, a printer, recording media, a computer or other data port or any other suitable device that uses the output of application 302.

Application 302 stores precomputed transforms 310 which are best adapted to account for channel mismatch. In one embodiment, the transforms 310 include a series of possible transformations (rather than just one) such that explicit knowledge of the channel is not needed. The system can then map arbitrarily from any channel state to any other channel state. The optimization functions of may include a feature mapping function that is internally comprised of multiple transforms (as opposed to a single transform) to provide this functionality at training. The applied mapping may be formed from several transforms that are selected (or weighted) according to their relevance. Once the set of transforms are learned, the speaker recognition system may be evaluated to ensure proper operation on any available channel types for that application. The multi-transform mapping block is then used to map all utterances.

Module 306 may include a security device that permits a user access to information, such as a database, an account, applications, etc. based on an authorization or confirmed identity as determined by application 302. Speech recognition system 304 may also recognize or decode the speech of a user despite the input type 301 that the user employs to communicate with device 300.

Having described preferred embodiments of a system and method for addressing channel mismatch through class specific (e.g., speaker discrimination) transforms (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for audio classification, comprising:
maximizing a discriminative criterion over a plurality of speakers to obtain a best transform for audio class modeling under a target channel condition state; and
transforming, based on said best transform, features of a speaker utterance in a source channel condition state with a processor to match the target channel condition state and as a result provide a channel matched transformed utterance.

2. The method as recited in claim 1, further comprising employing a speaker model trained using a first channel condition provided by a first hardware type.

3. The method as recited in claim 2, wherein the target channel condition state includes a second channel condition provided by a second hardware type.

4. The method as recited in claim 2, wherein the target channel condition state includes a neutralized channel condition which counters effects of the source channel condition state.

5. The method as recited in claim 1, wherein the system undergoes many input conditions and further comprises applying a best transform for each input condition.

6. The method as recited in claim 1, wherein maximizing a discriminative criterion includes determining a likelihood of a speaker based on discrimination between speaker classes to identify the speaker.

7. The method as recited in claim 1, wherein the discriminative criterion includes:

$$Q_1 = \prod_{s=1}^{S} \Pr(\lambda^s | \vec{Y}^s) \qquad (3)$$

where $Q_1$ is a function to be optimized, and $\Pr(\lambda^s|\vec{Y}^s)$ is a posterior probability of speaker model $\lambda^s$, given the speaker's channel matched transformed utterance, $\vec{Y}$.

8. The method as recited in claim 1, further comprising decoding speech based on a selected transform.

9. The method as recited in claim 1, further comprising transforming at least one speaker model from a first input type corresponding to the source channel condition state to a second input type corresponding to the target channel condition state by directly mapping features from the first input type to a second input type using a transform.

10. The method as recited in claim 1, wherein maximizing includes maximizing posterior probabilities.

11. A computer program product for audio classification comprising a computer useable storage medium including a computer readable program, wherein the computer readable program when executed on a computer causes the computer to perform the steps of:
maximizing a discriminative criterion over a plurality of speakers to obtain a best transform for audio class modeling under a target channel condition state; and
transforming, based on said best transform, features of a speaker utterance in a source channel condition state to match the target channel condition state and as a result provide a channel matched transformed utterance.

12. A method for audio classification, comprising:
providing a plurality of transforms for decoding utterances, wherein the transforms correspond to a plurality of input types; and
applying one of the transforms to a speaker using a processor based upon the input type;
wherein the transforms are precomputed by:
maximizing a discriminative criterion over a plurality of speakers to obtain a best transform for audio class modeling under a target channel condition state; and
transforming, based on said best transformation, features of a speaker utterance in a source channel condition state to match the target channel condition state and as a result provide a channel matched transformed utterance.

13. The method as recited in claim 12, wherein the best transform is determined for each input type and applied by determining conditions under which a speaker is providing input.

14. The method as recited in claim 12, wherein the input types include one or more of telephone handsets, channel types and microphones.

15. The method as recited in claim 12, wherein the different channel condition state includes a neutralized channel condition which counters effects of the source channel condition state.

16. The method as recited in claim 12, wherein maximizing a discriminative criterion includes determining a likelihood of a speaker based on discrimination between speaker classes to identify the speaker.

17. The method as recited in claim 12, wherein the discriminative criterion includes:

$$Q_1 = \prod_{s=1}^{S} \Pr(\lambda^s | \vec{Y}^s) \quad (3)$$

where $W_1$ is a function to be optimized, and $\Pr(\lambda^s|\vec{Y}^s)$ is the posterior probability of speaker model $\lambda^s$, given the speaker's channel matched transformed utterance, $\hat{Y}$.

18. The method as recited in claim 17, further comprising decoding speech based on a selected transform.

19. The method as recited in claim 12, wherein the transform reduces mismatch between input types.

20. A computer program product for audio classification comprising a computer useable storage medium including a computer readable program, wherein the computer readable program when executed on a computer causes the computer to perform the steps of:
  providing a plurality of transforms for decoding utterances, wherein the transforms correspond to a plurality of input types; and
  applying one of the transforms to a speaker based upon the input type;
  wherein the transforms are precomputed by:
    maximizing a discriminative criterion over a plurality of speakers to obtain a best transform for audio class modeling under a target channel condition state; and
    transforming, based on said best transform, features of a speaker utterance in a source channel condition state to match the target channel condition state and as a result provide a channel matched transformed utterance.

* * * * *